(12) United States Patent
Jang

(10) Patent No.: US 11,671,722 B2
(45) Date of Patent: Jun. 6, 2023

(54) IMAGE SENSING DEVICE

(71) Applicant: SK hynix Inc., Icheon-si (KR)

(72) Inventor: Jae Hyung Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 43 days.

(21) Appl. No.: 17/211,624

(22) Filed: Mar. 24, 2021

(65) Prior Publication Data
US 2021/0385399 A1  Dec. 9, 2021

(30) Foreign Application Priority Data

Jun. 5, 2020 (KR) ........................ 10-2020-0068395

(51) Int. Cl.
*H04N 25/702* (2023.01)
*G01S 17/08* (2006.01)
*H04N 25/77* (2023.01)

(52) U.S. Cl.
CPC ........... *H04N 25/702* (2023.01); *G01S 17/08* (2013.01); *H04N 25/77* (2023.01)

(58) Field of Classification Search
CPC .... H04N 5/3696; H04N 5/3745; H04N 5/357; H04N 5/341; H04N 5/369; H04N 5/36965; H04N 25/702; H04N 25/77; H04N 25/40; H04N 25/60; H04N 25/70; H04N 25/705; G01S 17/08; G01S 7/4863; G01S 17/10; G01S 17/894; H01L 27/1461; H01L 27/14612
See application file for complete search history.

(56) References Cited

U.S. PATENT DOCUMENTS

| 2015/0054998 | A1 | 2/2015 | Kanou |
| 2019/0252449 | A1 | 8/2019 | Ebiko |
| 2020/0028017 | A1* | 1/2020 | Imoto ................... H01L 31/101 |

* cited by examiner

*Primary Examiner* — Michael E Teitelbaum
(74) *Attorney, Agent, or Firm* — Perkins Coie LLP

(57) ABSTRACT

An image sensing device for measuring a distance between the image sensing device and a target object is disclosed. The image sensing device may include a plurality of image sensing pixels formed in a substrate, each image sensing pixel including a first electrical contact tap and a second electrical contact tap structured to generate a current in the substrate and capture photocharges generated by light reflected from an object and incident on the image sensing pixel array and migrating by the current to measure a distance to the object by performing demodulation operations based on the photocharges, and a demodulation driver coupled to the image sensing pixel array to apply, to the first electrical contact tap and the second electrical contact tap, a first demodulation control signal and a second demodulation control signal for generating the current, respectively.

12 Claims, 13 Drawing Sheets

IMAGE SENSING DEVICE

CROSS-REFERENCES TO RELATED APPLICATION

This patent document claims the priority and benefits of Korean application number 10-2020-0068395, filed on Jun. 5, 2020, which is incorporated herein by reference in its entirety as part of the disclosure of this patent document.

TECHNICAL FIELD

The technology and implementations disclosed in this patent document generally relate to an image sensing device for sensing a distance to a target object.

BACKGROUND

An image sensor is a device for capturing optical images by converting light into electrical signals using a photosensitive semiconductor material which reacts to light. With the development of automotive, medical, computer and communication industries, the demand for high-performance image sensors is increasing in various fields such as smart phones, digital cameras, game machines, TOT (Internet of Things), robots, security cameras and medical micro cameras.

The image sensor may be roughly divided into CCD (Charge Coupled Device) image sensors and CMOS (Complementary Metal Oxide Semiconductor) image sensors. The CCD image sensors offer a better image quality, but they tend to consume more power and are larger as compared to CMOS image sensors. The CMOS image sensors are smaller in size and consume less power than the CCD image sensors. In addition, the CMOS image sensors may be implemented using many different scanning methods. Furthermore, CMOS sensors are fabricated using the CMOS fabrication technology, and thus the CMOS image sensors and other signal processing circuitry can be integrated into a single chip, enabling the production of miniaturized image sensors at a lower cost. For these reasons, CMOS image sensors are being developed for many applications including mobile devices.

SUMMARY

The embodiments of the disclosed technology relate to an image sensing device include CAPD (current-assisted photonic demodulator) pixels having uniform characteristics.

In an embodiment of the disclosed technology, an image sensing device may include an image sensing pixel array comprising a plurality of image sensing pixels formed in a substrate, each image sensing pixel including a first electrical contact tap and a second electrical contact tap structured to generate a current in the substrate and capture photocharges generated by light reflected from an object and incident on the image sensing pixel array and migrating by the current to measure a distance to the object by performing demodulation operations based on the photocharges, and a demodulation driver coupled to the image sensing pixel array to apply, to the first electrical contact tap and the second electrical contact tap, a first demodulation control signal and a second demodulation control signal for generating the current, respectively. The plurality of image sensing pixels may include first and second image sensing pixels, and wherein a distance between the first image sensing pixel and the demodulation driver is smaller than a distance between the second image sensing pixel and the demodulation driver, and wherein the first image sensing pixel is structured to have a larger resistance than the second image sensing pixel.

In another embodiment of the disclosed technology, an image sensing device may include an image sensing pixel array comprising a plurality of image sensing pixels formed in a substrate, each image sensing pixel including a first electrical contact tap and a second electrical contact tap structured to generate a current in the substrate and capture photocharges generated by light reflected from an object and incident on the image sensing pixel array and migrating by the current to measure a distance to the object by performing demodulation operations based on the photocharges, and a demodulation driver coupled to the image sensing pixel array to apply, to the first electrical contact tap and the second electrical contact tap included in a photo-electric conversion area of each of the pixels, a first demodulation control signal and a second demodulation control signal for generating the current, respectively. The plurality of image sensing pixels may include first and second image sensing pixels, and a distance between the first image sensing pixel and the demodulation driver is smaller than a distance between the second image sensing pixel and the demodulation driver, and the photo-electric conversion area of the first image sensing pixel has a different structure from the photo-electric conversion area of the second image sensing pixel.

In another embodiment of the disclosed technology, an image sensing device may include a plurality of image sensing pixels to detect light reflected from an object in response to transmitted light to produce electric charges representing a correlation between the transmitted light and the reflected light to determine a distance to the object by performing a demodulation operation, and a demodulation driver coupled to the plurality of image sensing pixels through a plurality of column signal lines to control the demodulation operation by providing one or more demodulation control signals through the plurality of column signal lines. The plurality of image sensing pixels may include a first image sensing pixel including first and second electrical contact taps, and a second image sensing pixel including third and fourth electrical contact taps. The first and second image sensing pixels are coupled to a first column signal line. The image sensing pixels disposed between the demodulation driver and the second image sensing pixel are more than the image sensing pixels disposed between the demodulation driver and the first image sensing pixel. A distance between the first and second electrical contact taps is larger than a distance between the third and fourth electrical contact taps.

In another embodiment of the disclosed technology, an image sensing device may include a plurality of image sensing pixels to detect light reflected from an object in response to transmitted light to produce electric charges representing a correlation between the transmitted light and the reflected light to determine a distance to the object by performing a demodulation operation, and a demodulation driver coupled to the plurality of image sensing pixels through a plurality of column signal lines to control the demodulation operation by providing one or more demodulation control signals through the plurality of column signal lines. the plurality of image sensing pixels includes a first row including first and second electrical contact taps coupled to the demodulation driver through a first column signal line and a second row including third and fourth electrical contact taps coupled to the demodulation driver through a second column signal line to collect photocharges based on the one or more demodulation control signals. The first column signal line is shorter than the second column signal line. A distance between the first and second electrical contact taps is larger than a distance between the third and fourth electrical contact taps.

In another embodiment of the disclosed technology, an image sensing device may include: a pixel array comprising a plurality of pixels each configured to generate a hole current in a substrate, and capture photocharge which is generated by incident light and migrated by the hole current; and a demodulation driver configured to supply a first electrical contact tap and a second electrical contact tap of each of the pixels with a first demodulation control signal and a second demodulation control signal for generating the hole current, respectively. The distance between a first pixel of the pixel array and the demodulation driver may be smaller than the distance between a second pixel of the pixel array and the demodulation driver, and the first pixel may have larger pixel resistance than the second pixel.

In another embodiment of the disclosed technology, an image sensing device may include: a pixel array comprising a plurality of pixels each configured to generate a hole current in a substrate, and capture photocharge which is generated by incident light and migrated by the hole current; and a demodulation driver configured to supply a first electrical contact tap and a second electrical contact tap, included in a photo-electric conversion area of each of the pixels, with a first demodulation control signal and a second demodulation control signal for generating the hole current, respectively. The distance between a first pixel of the pixel array and the demodulation driver may be smaller than the distance between a second pixel of the pixel array and the demodulation driver, and the photo-electric conversion area of the first pixel may have a different structure from the photo-electric conversion area of the second pixel.

Based on the present embodiments, it is possible to remove noise caused by an IR drop from a pixel signal, by controlling a pixel resistance of a CAPD pixel.

DETAILED DESCRIPTION

Hereafter, various embodiments will be described with reference to the accompanying drawings. However, it should be understood that the disclosed technology is not limited to specific embodiments, but includes various modifications, equivalents and/or alternatives of the embodiments.

Much research is being conducted on a method for measuring a depth using an image sensor, and the demand for the method is rapidly increasing in various fields such as a security device, medical device, vehicle, game machine, VR/AR and mobile device. Representative examples of the method for measuring a depth may include triangulation, ToF (Time of Flight) and interferometry. Among the methods, the ToF method can be utilized in a wide range, has high processing speed, and can be implemented at low cost. Thus, the importance of the ToF method is rising. The ToF method may be roughly divided into a direct method for measuring a distance by calculating a round trip time and an indirect method for measuring a distance using a phase difference, based on the common principle to measure a distance using time for the emitted light to reach a target and the arrival of the reflected and returning light from the target. Since the direct method is suitable for a long distance, the direct method is often used in a vehicle and the like. The indirect method suitable for a short distance is used for a game machine or mobile camera which requires high processing speed. The indirect method can be implemented by using a simple circuit configuration with less memory space, and at a relatively low cost.

A current-assisted photonic demodulator (CAPD), which is one of pixel types of an indirect ToF sensor, applies a substrate voltage and detects electrons, which are generated in a pixel, using a majority current based on a voltage difference of an electric field. Since the majority current is used, the CAPD can rapidly detect electrons. The CAPD is disposed in a substrate that includes a first surface on which light is incident and a second surface facing away from the first surface. Since the CAPD detects electrons using electrical contact taps disposed on or near the second surface, the CAPD can even detect electrons that are generated deep in the substrate (e.g., a first depth from the first surface). Therefore, the CAPD may be considered to have excellent efficiency.

Figure 1:
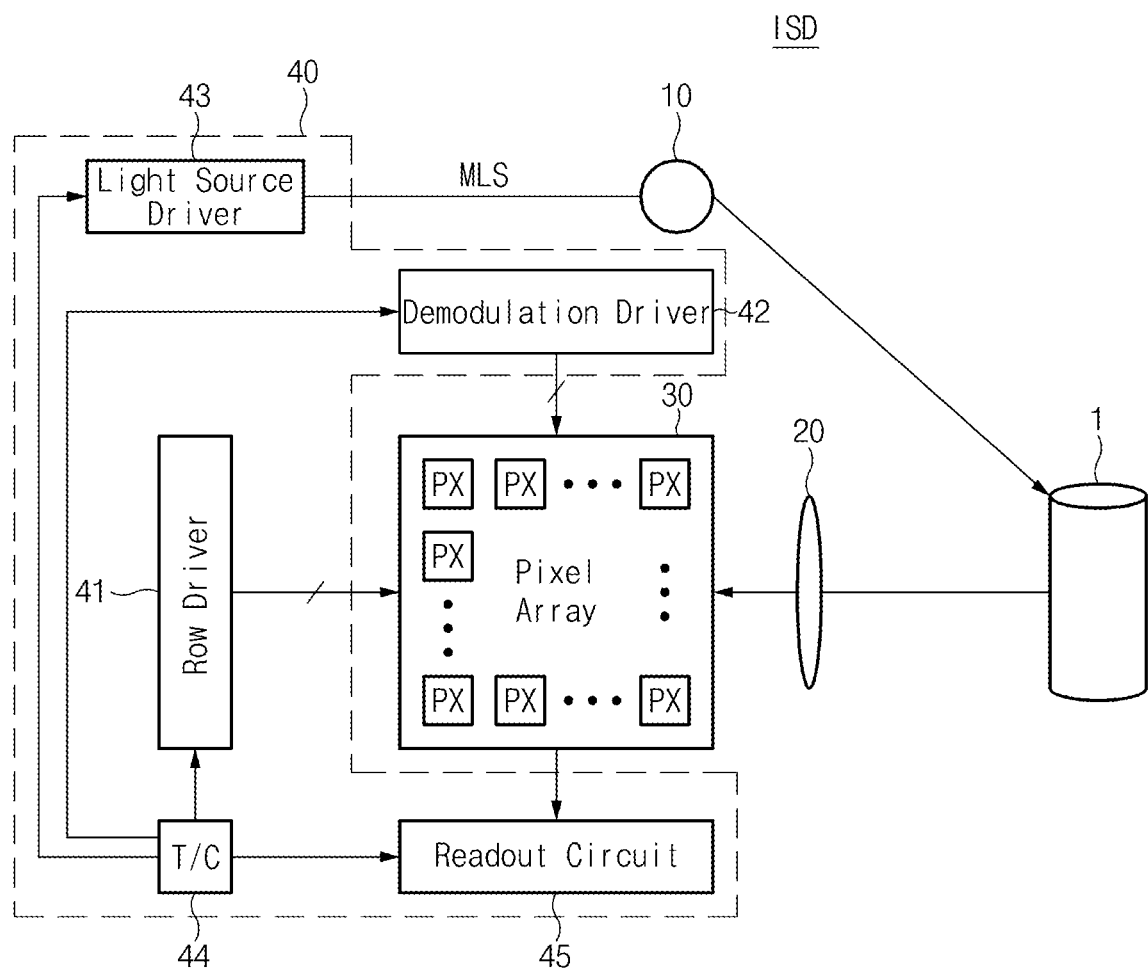
FIG. 1 illustrates an example configuration of an image sensing device based on some embodiments of the disclosed technology.

FIG. 1 illustrates an example configuration of an image sensing device based on some embodiments of the disclosed technology.

Referring to FIG. 1, the image sensing device ISD may measure a distance to a target object 1 using a ToF (Time of Flight) method. Such an image sensing device ISD may include a light source 10, a lens module 20, a pixel array 30 and a control block 40.

The light source 10 emits light to the target object 1 in response to a light modulation signal MLS from the control block 40. The light source 10 may be a laser diode (LD) or light emitting diode (LED), which emits light at a specific wavelength (e.g., near-infrared light, infrared light or visible light), near infrared laser (NIR), a point light source, a white lamp, a monochromatic light source having monochromators combined therein, or a combination of other laser light sources. For example, the light source 10 may emit infrared light having a wavelength of 800 nm to 1,000 nm. The light emitted from the light source 10 may be generated by modulating light at a predetermined frequency. FIG. 1 illustrates the image sensing device ISD as including only one light source 10. However, the image sensing device ISD may include a plurality of light sources arranged around the lens module 20.

The lens module 20 may collect light reflected from the target object 1 and focus the collected light on pixels PX of the pixel array 30. For example, the lens module 20 may include a focusing lens with a glass or plastic surface or a cylindrical optical element. The lens module 20 may include a plurality of lenses aligned with an optical axis.

The pixel array 30 may include a plurality of unit pixels PX arranged in a matrix array such as a 2D matrix array having columns and rows. The unit pixels PX may be formed on a semiconductor substrate. Each of the unit pixels PX may convert light collected using the lens module 20 into an electrical signal corresponding to the intensity of the light, and output the electrical signal as a pixel signal. In some implementations, the pixel signal may include a signal that indicates the distance to the target object 1, instead of the color of the target object 1. In some implementations, each of the unit pixels PX may be a CAPD (current-assisted photonic demodulator) pixel.

The control block 40 may control the light source 10 to emit light toward the target object 1. The unit pixels PX of the pixel array 30 may process pixel signals corresponding to light reflected from the target object 1, thereby measuring the distance to the surface of the target object 1.

Such a control block 40 may include a row driver 41, a demodulation driver 42, a light source driver 43, a timing controller 44 and a readout circuit 45.

In this patent document, the term "control circuit" can be used to indicate a driver circuit such as the row driver 41 and the demodulation driver 42. In some implementations, a driver may include a circuit or component for controlling another circuit or component. In some implementations, a driver may include an amplifier circuit for driving a transmission line coupled to image sensing pixel or peripheral circuitry. A ToF sensor can obtain the depth information of a scene. To this end, the ToF sensors may perform demodulation operations. That is, each pixel develops a charge that represents the correlation between transmitted and received light. In some implementations, the demodulation driver 42 may be used to control the demodulation operations.

The control circuit may perform the operations of the unit pixels PX of the pixel array 30 in response to a timing signal outputted from the timing controller 44.

The control circuit may generate a control signal to select and control one or more rows (e.g., components connected to the one or more rows) among a plurality of rows of the pixel array 30. Such a control signal may include a demodulation control signal for generating a hole current within a substrate, a reset signal for controlling a reset transistor, a transmission signal for controlling transfer of optical charges accumulated in a detection node, a floating diffusion signal for providing an additional capacitance under a high luminance condition, and a selection signal for controlling a selection transistor.

The row driver 41 may generate the reset signal, the transmission signal, the floating diffusion signal and the selection signal, and the demodulation driver 42 may generate the demodulation control signal.

The light source driver 42 may generate the light modulation signal MLS for modulating light from the light source 10 based on control signals of the timing controller (T/C) 44. The light modulation signal MLS may be generated by modulating a signal at a predetermined frequency.

The timing controller 44 may generate a timing signal for controlling the operations of the row driver 41, the demodulation driver 42, the light source driver 42 and the readout circuit 45.

The readout circuit 45 may generate pixel data in the form of digital signals by processing pixel signals outputted from the pixel array 30, under control of the timing controller 44. For this operation, the readout circuit 45 may include a correlated double sampler (CDS) for performing correlated double sampling on the pixel signals outputted from the pixel array 30. The readout circuit 45 may include an analog-digital converter for converting the output signals from the CDS into digital signals. Furthermore, the readout circuit 45 may include a buffer circuit to hold or temporarily store pixel data outputted from the analog-digital converter and outputs the pixel data to the outside based on commands and/or control signals provided by the timing controller 44. In some implementations, the pixel array 30 may include CAPD pixels. The pixel array 30 may include two column lines per one column of the pixel array 30 to transfer pixel signals, and components for processing pixel signals outputted from the column lines may also be provided for the respective column lines.

The light source 10 may emit light, modulated at a predetermined frequency, toward a scene to be captured by the image sensing device ISD, and the image sensing device ISD may detect or sense modulated light (i.e., light incident upon the image sensor) reflected from the target objects 1 within the scene, and generate depth information for each of the unit pixels PX. Between the modulated light and the incident light, a time delay is present due to the distance between the image sensing device ISD and the target object 1. Such a time delay appears as a phase difference between a signal generated by the image sensing device ISD and the light modulation signal MLS for controlling the light source 10. An image processor (not illustrated) may generate a depth image containing depth information for each of the unit pixels PX by calculating a phase difference which occurs in a signal outputted from the image sensing device ISD.

Figure 2:
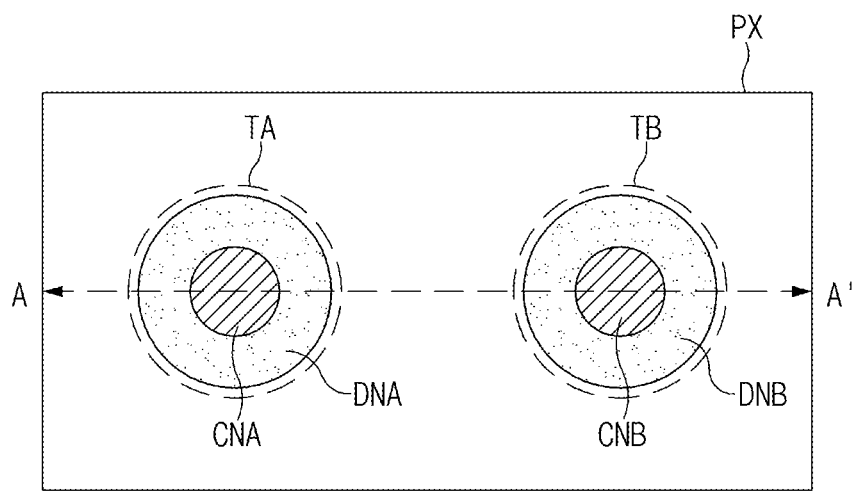
FIG. 2 illustrates an example layout of a pixel array illustrated in FIG. 1.

FIG. 2 illustrates an example layout of the pixel array illustrated in FIG. 1.

Referring to FIG. 2, the pixel PX illustrated in FIG. 1 may include one or more electrical contact taps that can be called as taps or contact nodes. In some implementations, the electrical contact taps or contact nodes are electrical contacts for circuitry that are structured for carrying electrical signals associated with photocharges, e.g., collecting photocharges generated in image sensor pixels to perform demodulation operations. In some implementations, the demodulation operations may be performed to determine the correlation (e.g., a phases difference) between the emitted light (modulated light) and the received light, providing the depth information of a scene. By way of example, FIG. 2 illustrates the pixel PX as having two electrical contact taps. In other examples, the pixel PX may include only one electrical contact tap or three or more electrical contact taps. Although FIG. 2 illustrates only one pixel PX, other pixels in the pixel array 30 may have the same structure as the pixel PX illustrated in FIG. 2.

The pixel PX may include a first electrical contact tap TA and a second electrical contact tap TB. In some implementations, each pixel PX may include three or more electrical contact taps. The plurality of electrical contact taps may receive the same or different types of demodulation control signals. The different types of demodulation control signals may indicate demodulation control signals received at different timings.

FIG. 2 illustrates that the first and second electrical contact taps TA and TB are arranged in a horizontal direction. However, in another embodiment of the disclosed technology, the first and second electrical contact taps TA and TB may be arranged in a vertical or diagonal direction.

The first electrical contact tap TA may include a first control node CNA and a first detection node DNA surrounding the first control node CNA. FIG. 2 illustrates that the first control node CNA has a circular shape, and the first detection node has a ring shape. However, the scope of the disclosed technology is not limited thereto. The ring shape of the first detection node DNA may increase the area that in contact with the first control node CNA. The ring-shaped first detection node DNA may efficiently capture signal carriers that move along a hole current formed by the first control node CNA.

The first control node CNA is in contact with the first detection node DNA. In some implementations, the first control node CNA and the first detection node DNA may be isolated from each other by junction isolation through counter doping.

In another embodiment, the first control node CNA and the first detection node DNA may be spaced apart from each other by a predetermined distance. In this case, the first control node CNA and the first detection node DNA may be physically isolated from each other by a dielectric layer formed by filling a trench, formed by a shallow trench isolation (STI) process, with a dielectric material.

The second electrical contact tap TB may include a second control node CNB and a second detection node DNB surrounding the second control node CNB. The structures of the second control node CNB and the second detection node DNB may be identical to those of the first control node CNA and the first detection node DNA.

Figure 3:
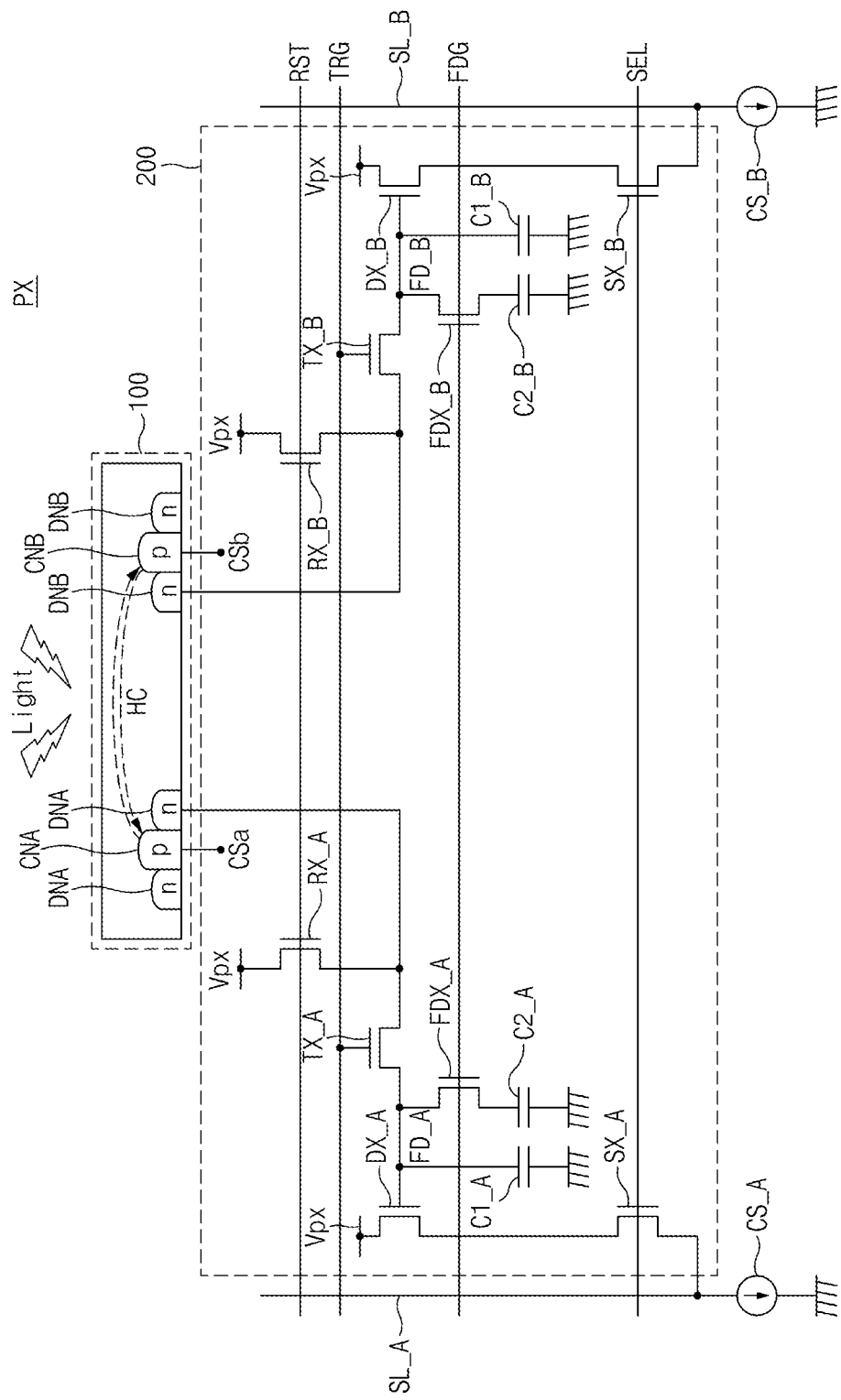
FIG. 3 illustrates an example structure of the pixel array illustrated in FIG. 2.

FIG. 3 illustrates an example structure of the pixel array illustrated in FIG. 2, including a cross-section of the pixel PX taken along the cutting line A-A' of FIG. 2 and the corresponding circuitry.

Referring to FIG. 3, the pixel PX may include a photo-electric conversion area 100 and a circuit area 200.

The photo-electric conversion area 100 is the cross-section of the pixel PX, taken along the cutting line A-A' of FIG. 2.

The photo-electric conversion area 100 may include the first and second control nodes CNA and CNB and the first and second detection nodes DNA and DNB. The first control node CNA and the first detection node DNA may constitute the first electrical contact tap (or a first demodulation node), and the second control node CNB and the second detection node DNB may constitute the second electrical contact tap (or a second demodulation node).

The first and second control nodes CNA and CNB and first and second detection nodes DNA and DNB may be formed in a substrate. In some implementations, the substrate may be a P-type semiconductor substrate, the first and second control nodes CNA and CNB may be P-type impurity areas, and the first and second detection nodes DNA and DNB may be N-type impurity areas.

The first and second control nodes CNA and CNB may receive first and second demodulation control signals CSa and CSb, respectively, from the demodulation driver 42. A voltage difference between the first and second demodulation control signals CSa and CSb generates a hole current HC to control a flow of signal carriers generated in the substrate by incident light. When the voltage of the first demodulation control signal CSa is higher than that of the second demodulation control signal CSb, the hole current HC flows from the first control node CNA to the second control node CNB. When the voltage of the first demodulation control signal CSa is lower than that of the second demodulation control signal CSb, the hole current HC flows from the second control node CNB to the first control node CNA.

Each of the first and second detection nodes DNA and DNB may capture electrical signal carriers that move along the flow of the hole current HC.

In an embodiment, the first and second control nodes CNA and CNB may include P− type impurity areas having different doping concentrations. For example, a P-type impurity area (P−area) having a relatively low doping concentration may be formed in the substrate, and a P-type impurity area (P+area) having a relatively high doping concentration may be formed in the same position and have a smaller depth than the P−area. The first and second detection nodes DNA and CNB may include N-type impurity areas having different doping concentrations. For example, an N-type impurity area (N−area) having a relatively low doping concentration may be formed in the substrate, and an N-type impurity area (N+area) having a relatively high doping concentration may be formed in the same position and have a smaller depth than the N−area.

The depth of the P− area may be larger than the depth of the N−area. In this way, the hole current HC can flow more smoothly.

In an embodiment, the photo-electric conversion area 100 may capture photocharges during first and second periods, which are sequential time periods.

In the first period, the light incident upon the pixel PX may be converted into electrical signals, and thus generate an electron-hole pair corresponding to the intensity of the incident light. In some embodiments of the disclosed technology, the electrons generated in response to the intensity of the incident light may indicate photocharges. Here, the demodulation driver 42 may apply the first demodulation control signal CSa to the first control node CNA, and apply the second demodulation control signal CSb to the second control node CNB. Here, the voltage of the first demodulation control signal CSa may be higher than that of the second demodulation control signal CSb. Here, the voltage of the first demodulation control signal CSa may be defined as an active voltage, and the voltage of the second demodulation control signal CSb may be defined as an inactive voltage. For example, the voltage of the first demodulation control signal CSa may be 1.2V, and the voltage of the second demodulation control signal CSb may be 0V.

Due to a voltage difference between the first and second demodulation control signals CSa and CSb, an electric field may be generated between the first and second control nodes CNA and CNB, and the hole current HC may flow from the first control node CNA to the second control node CNB. That is, holes within the substrate may migrate toward the second control node CNB, and electrons within the substrate may migrate toward the first control node CNA.

Electrons may be generated in the substrate in response to the luminous intensity of incident light, and the generated electrons may migrate toward the first control node CNA and may be captured by the first detection node DNA adjacent to the first control node CNA. Therefore, the electrons within the substrate may be used as signal carriers for detecting the luminous intensity of the incident light.

In the second period succeeding the first period, light incident upon the pixel PX may be converted into electrical signals according to the photo-electric effect, and thus generate an electron-hole pair corresponding to the intensity of the incident light. Here, the demodulation driver 42 may apply the first demodulation control signal CSa to the first control node CNA, and apply the second demodulation control signal CSb to the second control node CNB. Here, the first demodulation control signal CSa may have a lower voltage than the second demodulation control signal CSb.

Here, the voltage of the first demodulation control signal CSa may be defined as an inactive voltage, and the voltage of the second demodulation control signal CSb may be defined as an active voltage. For example, the first demodulation control signal CSa may be 0V, and the second demodulation control signal CSb may be 1.2V.

Due to a voltage difference between the first and second demodulation control signals CSa and CSb, an electric field may be generated between the first and second control nodes CNA and CNB, and the hole current HC may flow from the second control node CNB to the first control node CNA. That is, holes within the substrate may migrate toward the first control node CNA, and electrons within the substrate may migrate toward the second control node CNB.

That is, electrons may be generated in the substrate in response to the luminous intensity of incident light, and the generated electrons may migrate toward the second control node CNB and are accumulated at the second detection node DNB adjacent to the second control node CNB. Therefore, the electrons within the substrate may be used as signal carriers for detecting the luminous intensity of the incident light.

In an embodiment, the first period is before the second period. In another embodiment, the second period is before the first period.

The circuit area 200 may include a plurality of elements for converting the photocharges, captured by the first detection node DNA and the second detection node DNB, into electric signals by processing the photocharges. Control signals RST, TRG, FDG and SEL applied to the plurality of elements may be applied from the row driver 41. Furthermore, a pixel voltage Vpx may be a power supply voltage VDD.

In some implementations, the photocharge may be captured by the first detection node DNA as will be discussed below. The circuit area 200 may include a reset transistor RX_A, a transmission transistor TX A, a first capacitor C1_A, a second capacitor C2_A, a floating diffusion transistor FDX_A, a drive transistor DX A and a selection transistor SX_A.

The reset transistor RX_A may be activated in response to a logic high level of the reset signal RST applied to a gate electrode thereof, and reset the voltages of a floating diffusion node FD_A and the first detection node DNA to a predetermined level (i.e., the pixel voltage Vpx). When the reset transistor RX_A is activated, the transmission transistor TX A may also be simultaneously activated to reset the floating diffusion node FD_A.

The transmission transistor TX_A may be activated in response to a logic high level of the transmission signal TRG applied to a gate electrode thereof, and transmit the electric charge accumulated in the first detection node DNA to the floating diffusion node FD_A.

The first capacitor C1_A may be coupled to the floating diffusion node FD_A and provide a predetermined capacitance.

The second capacitor C1_A may be selectively coupled to the floating diffusion node FD_A according to the operation of the floating diffusion transistor FDX_A and provide an additional predetermined capacitance.

Each of the first and second capacitors C1_A and C2_A may be configured as one or more of an MIM (metal-insulator-metal) capacitor, MIP (metal-insulator-polysilicon) capacitor, MOS (metal-oxide-semiconductor) capacitor and a junction capacitor, for example.

The floating diffusion transistor FDX_A may be activated in response to a logic high level of the floating diffusion signal FDG applied to a gate electrode thereof, and couple the second capacitor C2_A to the floating diffusion node FD_A.

Under a high luminance condition in which the luminous intensity of incident light is relatively high, the row driver 41 may activate the floating diffusion transistor FDX_A to couple the floating diffusion node FD_A to the second capacitor C2_A. Thus, under such a high luminance condition, the floating diffusion node FD_A can accumulate more photocharges, which makes it possible to secure a high dynamic range.

Under a low luminance condition in which the luminous intensity of incident light is relatively low, the row driver 41 may deactivate the floating diffusion transistor FDX_A to decouple the floating diffusion node FD_A and the second capacitor C2_A from each other.

In another embodiment, the floating diffusion transistor FDX_A and the second capacitor C2_A may be omitted.

The drive transistor DX_A may constitute a source follower circuit with a load of a constant current source circuit CS_A, such as a MOS capacitor, coupled to one end of a vertical signal line SL_A, as a drain electrode thereof is coupled to the pixel voltage Vpx and a source electrode thereof is coupled to the vertical signal line SL_A through the selection transistor SX_A. That is, the driver transistor DX_A may output, to the vertical signal line SL A, through the selection transistor SX_A, a current corresponding to the voltage of the floating diffusion node FD_A coupled to a gate electrode thereof.

The selection transistor SX_A may be activated in response to a logic high level of the selection signal SEL applied to a gate electrode thereof, and output a pixel signal, outputted from the drive transistor DX_A, to the vertical signal line SL_A.

In order to process the photocharge captured by the second detection node DNB, the circuit area 200 may include a reset transistor RX_B, a transmission transistor TX_B, a first capacitor C1_B, a second capacitor C2_B, a floating diffusion transistor FDX_B, a drive transistor DX_B and a selection transistor SX_B. Since the elements for processing the photocharge captured by the second detection node DNB are configured and operated in the same manner as the above-described elements for processing the photocharge captured by the first detection node DNA except operation timings, the duplicate description thereof will be omitted.

The pixel signals outputted to the vertical signal lines SL_A and SL_B, respectively, from the circuit area 200 may be converted into image data through noise reduction and analog-digital conversion.

FIG. 3 illustrates that each of the reset signal RST, the transmission signal TRG, the floating diffusion signal FDG and the selection signal SEL is applied through one signal line. However, each of the reset signal RST, the transmission signal TRG, the floating diffusion signal FDG and the selection signal SEL may be applied through a plurality of signal lines (e.g., two signal lines) such that the elements for processing the photocharge captured by the first detection node DNA and the elements for processing the photocharge captured by the second detection node DNB are operated at different timings.

The image processor (not illustrated) may calculate a phase difference by performing an operation on the image data acquired from the photocharge captured by the first detection node DNA and the image data acquired from the photocharge captured by the second detection node DNB, calculate depth information, indicating the distance to the target object 1, from a phase difference corresponding to each of the pixels, and generate a depth image including the depth information corresponding to each of the pixels.

Figure 4:
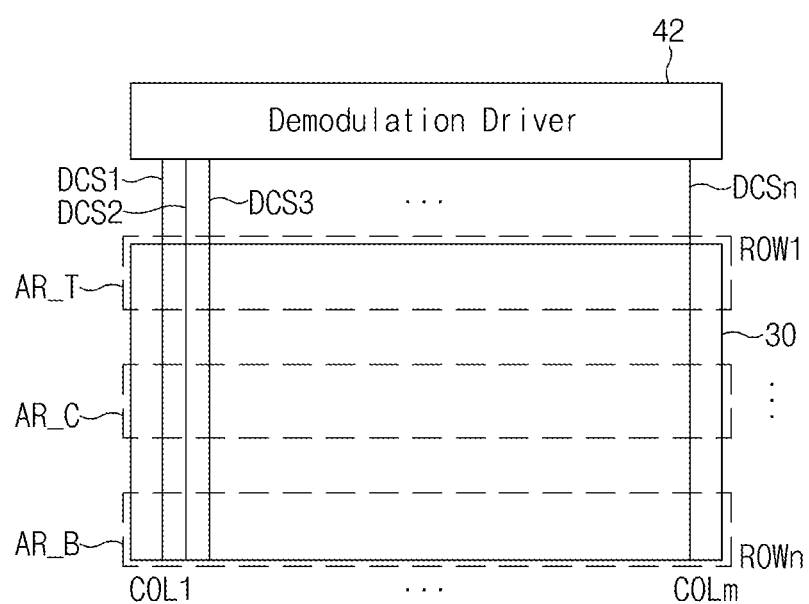
FIG. 4 illustrates a pixel array and a demodulation driver illustrated in FIG. 1.

FIG. 4 illustrates the pixel array 30 and the demodulation driver 42 illustrated in FIG. 1.

Referring to FIG. 4, the pixel array 30 may include pixels which are arranged in a matrix shape including n rows ROW1 to ROWn and m columns COL1 to COLm where n and m are integers equal to or more than 2.

The demodulation driver 42 may apply demodulation control signals to the m columns of the pixel array 30 through first to $m^{th}$ demodulation control signal lines DCS1 to DCSm. The first to $m^{th}$ demodulation control signal lines DCS1 to DCSm may be mapped to the m columns of the pixel array 30, respectively. The pixels belonging to the same column of the pixel array 30 may receive the demodulation control signals through the same demodulation control signal line. FIG. 3 illustrates each of the first to $m^{th}$ demodulation control signal lines DCS1 to DCSm as one signal line. However, each of the first to $m^{th}$ demodulation control signal lines DCS1 to DCSm may include a signal line (first sub signal line) for carrying the first demodulation control signal (for example, CSa) and a signal line (second sub signal line) for carrying the second demodulation control signal (for example, CSb). For example, the pixels belonging to the third column COL3 may receive the first and second demodulation control signals through the third demodulation control signal line DCS3.

The pixel array 30 may include a first area AR_T, a second area AR_C, and a third area AR_B.

In some implementations, the second area AR_C is located at a location between the first row ROW1 and the last row ROWn of the pixel array. In one example, the second area AR_C is located at the center of the pixel array 30. Specifically, the second area AR_C may include one or more rows that are spaced apart from the first row ROW1 and the last row ROWn. In one example, the second area AR_C may include a row in the middle of the pixel array. In one example, the second area AR_C may include a certain row ROWk or a row near ROWk situated between the first and last rows ROW1 and ROWn of the pixel array 30, where k is n/2.

The first area AR_T may be arranged between the second area ARC and the demodulation driver 42. In some implementations, the first area AR_T may be located near the demodulation driver 42. (or the top of the second area AR_T). In one example, the first area AR_T may include one or more rows including the first row ROW1.

The third area AR_T may be arranged between the second area AR_C and the farthest side from the demodulation driver 42. In some implementations, the third area AR_T may include one or more rows including the last row ROWn.

That is, the distance between the demodulation driver 42 and the first area AR_T is smaller than the distance between the demodulation driver 42 and the second area AR_C and the distance between the demodulation driver 42 and the third area AR_B, and the distance between the demodulation driver 42 and the second area AR_C is smaller than the distance between the demodulation driver 42 and the third area AR_B.

In some embodiments of the disclosed technology, pixels included in the second area AR_C, the first area AR_T and the third area AR_B, respectively, may have different structures. The structures may vary depending on the locations of the pixels as will be discussed below with reference to FIGS. 7 to 9.

Figure 5A:
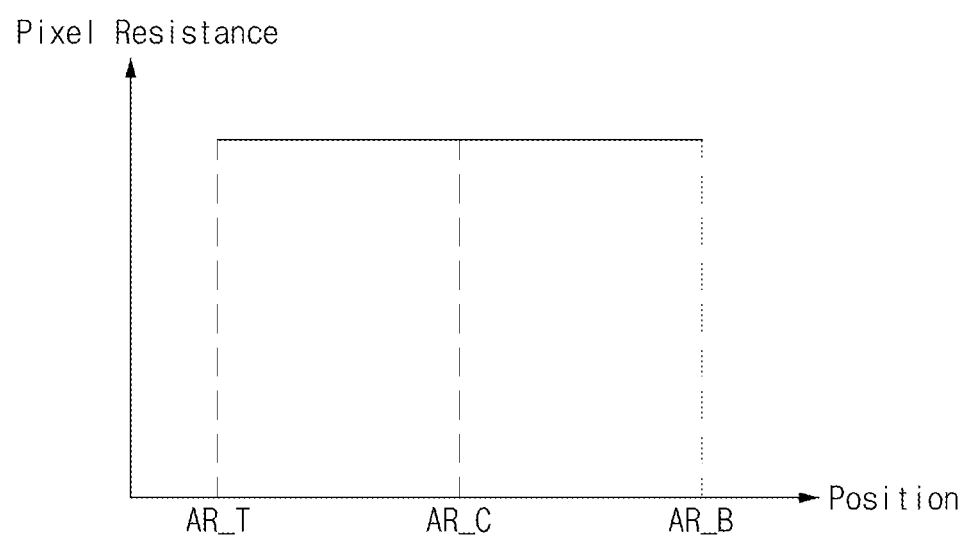
FIGS. 5A to 5C show how image shading occurs.
Figure 5B:
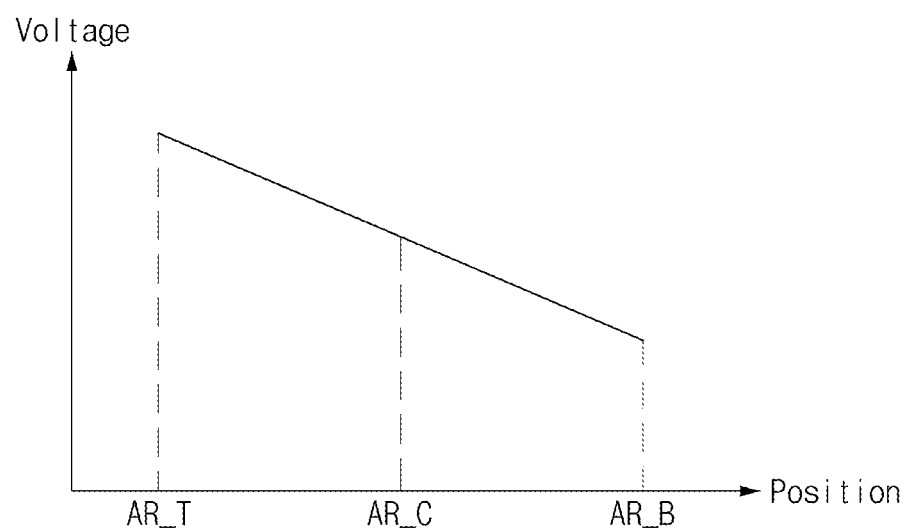
Figure 5C:
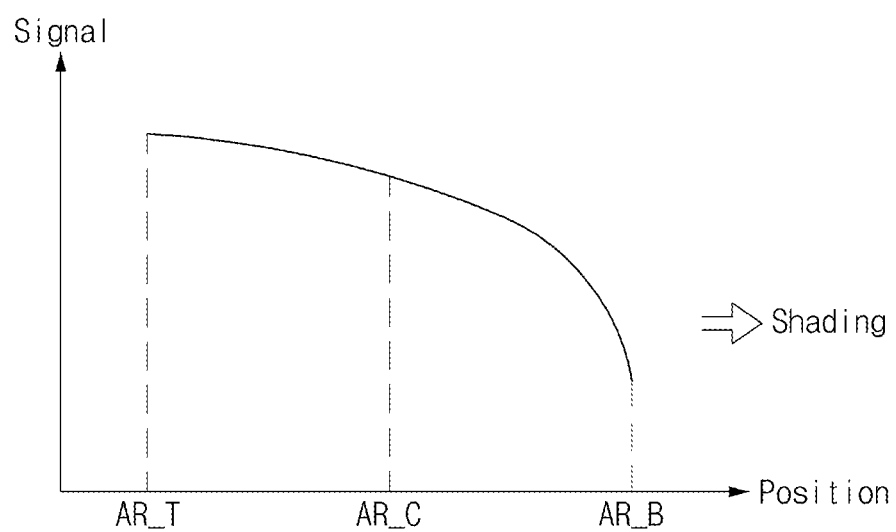

FIGS. 5A to 5C show how image shading occurs.

FIG. 5A is a graph illustrating a change in the pixel resistance depending on the position of a pixel in a pixel array. In this example, it is assumed that the pixels within the pixel array 30 have the same structure, unlike the other examples discussed in this patent document. In FIGS. 5A to 5C, a position corresponding to the X-axis may indicate a position that can vary depending on the distance between the demodulation driver 42 and the corresponding pixel within the same column.

The resistance at each pixel may vary depending on the structure thereof. The pixel resistance may indicate a resistance component that can, at least in part, determine a hole current flowing between the first and second control nodes. That is, the pixel resistance may be defined as the ratio of a voltage applied between the first and second control nodes (a voltage difference between the first and second demodulation control signals) to a hole current flowing between the first and second control nodes. Therefore, the hole current flowing between the first and second control nodes may decrease as the pixel resistance increases.

In some implementations, the pixel resistance may vary depending on the shapes of the first and second control nodes, the interval between the first and second control nodes, the depths of the first and second control nodes, the depths of the first and second detection nodes.

As illustrated in FIG. 5A, if the pixels included in the pixel array 30 have the same structure, the pixels may have constant pixel resistance regardless of the positions thereof in the pixel array 30.

FIG. 5B is a graph illustrating a change in the voltage of the first or second demodulation control signal depending on the position of a pixel in the pixel array. The pixels belonging to any one column of the pixel array 30 may receive the first and second demodulation control signals through the same demodulation control signal line.

The demodulation driver 42 may apply the first and second demodulation control signals to a demodulation control signal line, such as the third demodulation control signal line DCS3, to perform the operations of the pixels belonging to a column, such as the third column COL3. That is, the first sub signal line of the third demodulation control signal line DCS3 may be coupled to the first control node of each of the pixels belonging to the third column COL3, and the second sub signal line of the third demodulation control signal line DCS3 may be coupled to the second control node of each of the pixels belonging to the third column COL3.

When the demodulation driver 42 applies the first demodulation control signal having an active voltage (e.g., 1.2V) and the second demodulation control signal having an inactive voltage (e.g., 0V) to the third demodulation control signal line DCS3, the voltage of the first demodulation control signal applied to a pixel may decrease as the distance between the corresponding pixel and the demodulation driver 42 increases.

Similarly, when the demodulation driver 42 applies the first demodulation control signal having an inactive voltage (e.g., 0V) and the second demodulation control signal having an active voltage (e.g., 1.2V) to the third demodulation control signal line DCS3, the voltage of the second demodulation control signal applied to a pixel may decrease as the distance between the corresponding pixel and the demodulation driver 42 increases.

This is because a metal line forming the third demodulation control signal line DCS3 and the pixels coupled to the third demodulation control signal line DCS3 serve as resistance components to cause an IR drop. As the distance between a pixel and the demodulation driver 42 increases, the length of the metal line and the number of pixels disposed between the corresponding pixel and the demodulation driver 42 may increase. Therefore, the voltage of the first or second demodulation control signal applied to the corresponding pixel may decrease in response to the distance between the corresponding pixel and the demodulation driver 42.

That is, the voltage of the first or second demodulation control signal applied to a pixel included in the second area AR_C is smaller than the voltage of the first or second demodulation control signal applied to a pixel included in the first area AR_T, and the voltage of the first or second demodulation control signal applied to a pixel included in the third area AR_B is smaller than the voltage of the first or second demodulation control signal applied to a pixel included in the first area AR_T and the voltage of the first or second demodulation control signal applied to a pixel included in the second area AR_C.

In FIG. 5B, the voltage of the first or second demodulation control signal is illustrated as decreasing from the first area AR_T toward the third area AR_B. The voltage in FIG. 5B may also indicate a voltage difference between the first and second demodulation control signals, and the voltage difference may decrease. That is, since the inactive voltage is set to 0V, the voltage of the first or second demodulation control signal corresponding to the active voltage may indicate a voltage difference between the first and second demodulation control signals.

FIG. 5C is a graph illustrating a change in the pixel signal of a pixel depending on the position of the corresponding pixel in the pixel array. In FIG. 5C, it is assumed that the intensity of all light rays incident on the pixels and the timing when the light rays are incident on the pixels are the same across the pixel array 30. Under such an ideal condition, the pixel signals of all the pixels of the pixel array 30 have the same intensity.

As described above with reference to FIG. 5B, however, the voltage of the first or second demodulation control signal applied to a pixel decreases as the distance between the corresponding pixel and the demodulation driver 42 increases. Thus, the voltage difference between the first and second demodulation control signals also decreases.

A hole current flowing between the control nodes which receive different voltages increases as the voltage difference between the control nodes increases or the pixel resistance decreases. On the contrary, the hole current flowing between the control nodes which receive different voltages decreases as the voltage difference between the control nodes decreases or the pixel resistance increases.

Therefore, as the distance between a pixel and the demodulation driver 42 increases, the intensity of a hole current flowing in the corresponding pixel decreases, resulting in a decrease in the quantity of signal carriers that migrate and are captured by the hole current. Thus, as the distance between a pixel and the demodulation driver 42 increases, the intensity of the pixel signal of the corresponding pixel also decreases.

That is, the intensity of the pixel signal of a pixel included in the second area AR_C is smaller than the intensity of the pixel signal of a pixel included in the first area AR_T, and the intensity of the pixel signal of a pixel included in the third area AR_B smaller than the intensity of the pixel signal of a pixel included in the second area AR_C and the intensity of the pixel signal of a pixel included in the first area AR_T.

As such, the pixel signals that are unevenly generated by the entire pixel array 30 in response to uniform light signals may contain noise caused by an IR drop, causing an error in calculating the distance to the target object 1.

Figure 6A:
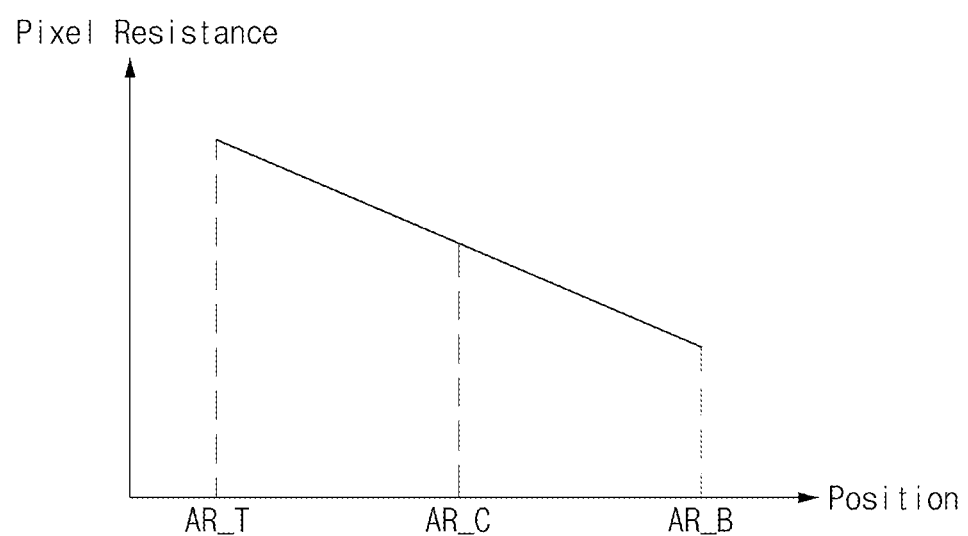
FIGS. 6A to 6C show how the image shading is removed based on some embodiments of the disclosed technology.
Figure 6B:
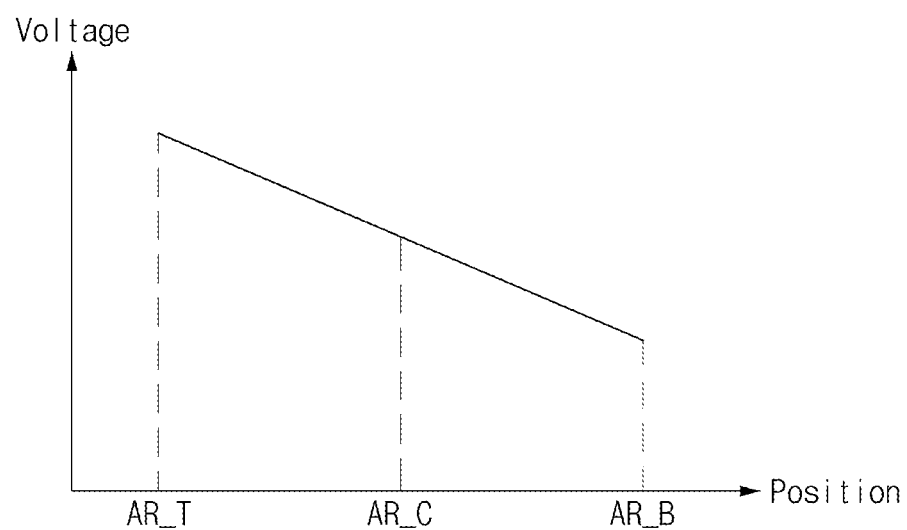
Figure 6C:
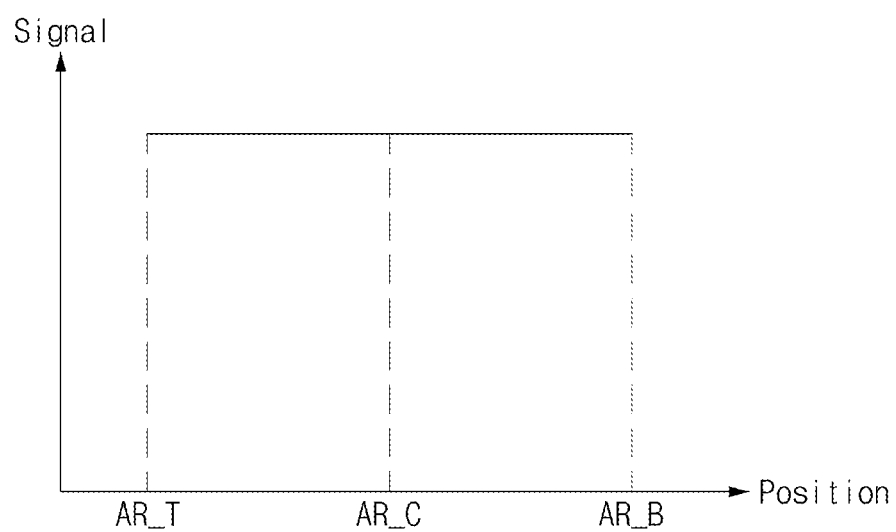

FIGS. 6A to 6C show how the image shading is removed based on an embodiment of the disclosed technology.

FIG. 6A is a graph illustrating a change in the pixel resistance depending on the position of a pixel in the pixel array 30. In some embodiments of the disclosed technology, the pixels in the pixel array 30 may have a different structure depending on where they are located in the pixel array 30. In FIGS. 6A to 6C, a position corresponding to the X-axis may indicate a position according to the distance between the demodulation driver 42 and the corresponding pixel within the same column.

In the pixel array 30 based on an embodiment of the disclosed technology, the pixel resistance of the pixel may gradually decrease from the first area AR_T toward the third area AR_B. The decrease in the pixel resistance may be experimentally determined so that the intensities of pixel signals are constant across the entire pixel array 30.

As will be discussed with reference to FIGS. 7 to 9 below, the pixel resistance of each of the pixels may be controlled by changing the structure of the photo-electric conversion area included in the pixel.

FIG. 6B is a graph illustrating a change in the voltage of the first or second demodulation control signal depending on the position of a pixel in the pixel array based on an embodiment of the disclosed technology.

The changes in the voltage of the first or second demodulation control signal depending on the position of a pixel in the pixel array based on an embodiment of the disclosed technology may be substantially the same as in the graph illustrated in FIG. 5B.

Therefore, the voltage of the first or second demodulation control signal may gradually decrease from the first area AR_T toward the third area AR_B.

If the voltage of the first or second demodulation control signal is constant across the pixel array from the first area AR_T toward the third area AR_B or the voltage difference between the first and second demodulation control signals is constant, the pixel resistance of the pixel may gradually decrease from the first area AR_T toward the third area AR_B. Therefore, the magnitude of the hole current may gradually increase.

FIG. 6C is a graph illustrating a change in the pixel signal of a pixel depending on the position of the corresponding pixel in the pixel array 30 based on an embodiment of the disclosed technology. In FIG. 6C, it is assumed that the intensity of all light rays incident on the pixels and the timing when the light rays are incident on the pixels are the same across the pixel array 30.

As described above with reference to FIG. 6B, the voltage of the first or second demodulation control signal applied to a pixel decreases as the distance between the corresponding pixel and the demodulation driver 42 increases. Thus, the voltage difference between the first and second demodulation control signals also decreases.

A hole current flowing between the control nodes which receive different voltages increases as the voltage difference between the control nodes increases or the pixel resistance decreases. On the contrary, a hole current flowing between the control nodes which receive different voltages decreases as the voltage difference between the control nodes decreases or the pixel resistance increases.

In some embodiments of the disclosed technology, the voltage difference between the first and second demodulation control signals decreases as the distance between a pixel and the demodulation driver 42 increases. However, the pixel resistance also decreases together. Therefore, the intensity of the hole current flowing in the pixel may stay constant from the first area ART toward the third area AR_B, and the quantity of signal carriers that migrate and are captured by the hole current may also stay constant. Thus, regardless of the distance between a pixel and the demodulation driver 42, the intensity of the pixel signal may be constant across the pixel array.

That is, the intensity of the pixel signal of a pixel included in the first area AR_T, the intensity of the pixel signal of a pixel included in the second area AR_C and the intensity of the pixel signal of a pixel included in the third area AR_B may be equal to one another.

As such, the pixel signals generated by the entire pixel array 30 in response to uniform light signals may avoid an undesirable noise that would have caused by an IR drop, and minimize an error in calculating the distance to the target object 1.

Figure 7:
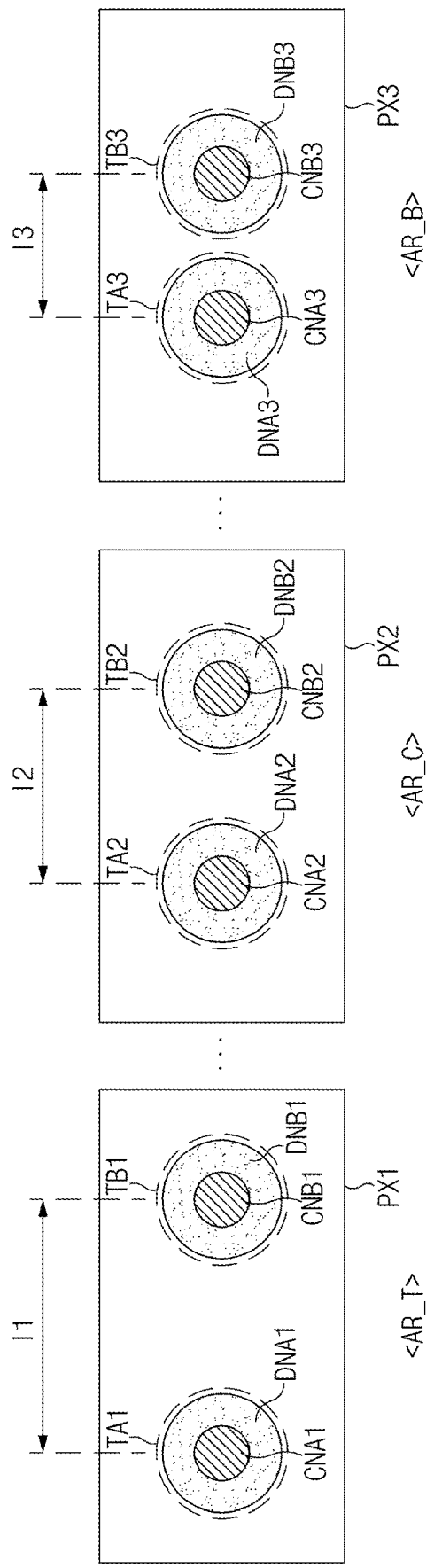
FIG. 7 is a diagram illustrating an example arrangement of a pixel array based on some embodiments of the disclosed technology.

FIG. 7 is a diagram illustrating an example arrangement of a pixel array based on some embodiments of the disclosed technology.

FIG. 7 is a plan view illustrating a first pixel PX1 included in the first area AR_T, a second pixel PX2 included in the second area AR_C, and a third pixel PX3 included in the third area AR_B. Each of the first to third pixels PX1 to PX3 may be coupled to the demodulation driver 42 through the same demodulation control signal line.

The first pixel PX1 may include a first electrical contact tap TA1 and a second electrical contact tap TB1. The first electrical contact tap TA1 may include a first control node CNA1 and a first detection node DNA1, and the second electrical contact tap TB1 may include a second control node CNB1 and a second detection node DNB1. The interval between the first control node CNA1 and the second control node CNB1 may be set to a first interval I1. In an embodiment of disclosed technology, the interval between the control nodes adjacent to each other may indicate the interval between the centers of the respective control nodes.

The second pixel PX2 may include a first electrical contact tap TA2 and a second electrical contact tap TB2. The first electrical contact tap TA2 may include a first control node CNA2 and a first detection node DNA2, and the second electrical contact tap TB2 may include a second control node CNB2 and a second detection node DNB2. The interval between the first control node CNA2 and the second control node CNB2 may be set to a second interval I2.

The third pixel PX3 may include a first electrical contact tap TA3 and a second electrical contact tap TB3. The first electrical contact tap TA3 may include a first control node CNA3 and a first detection node DNA3, and the second electrical contact tap TB3 may include a second control node CNB3 and a second detection node DNB3. The interval between the first control node CNA3 and the second control node CNB3 may be set to a third interval I3.

In the pixel array 30 based on an embodiment of the disclosed technology, the interval between the first and second control nodes included in a pixel may be gradually decreased from the first area ART toward the third area ARB or as the distance between the pixel and the demodulation driver 42 increases. Therefore, as illustrated in FIG. 7, the first interval I1 may be larger than the second interval I2, and the second interval I2 may be larger than the third interval I3. Since the interval between the first and second control nodes may be proportional to the length of a conducting wire through which a current flows, the pixel resistance may decrease as the interval between the first and second control nodes decreases.

Therefore, the pixel resistance may gradually decrease from the first area AR_T toward the third area AR_B, even though the voltage of the first or second demodulation control signal drops. Thus, under a condition of uniform light signals, the intensity of the pixel signal may be uniformly retained across the entire pixel array 30.

Figure 8:
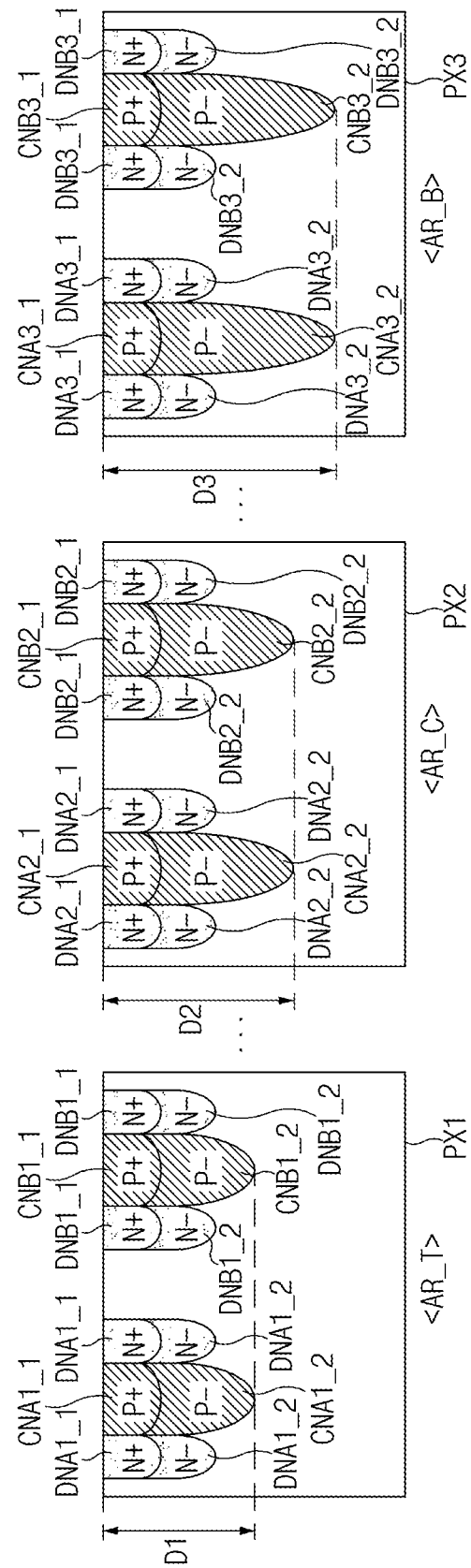
FIG. 8 is a diagram illustrating an example structure of a pixel array based on some embodiments of the disclosed technology.

FIG. 8 is a diagram illustrating an example structure of a pixel array based on some embodiments of the disclosed technology.

FIG. 8 is a vertical cross-sectional view illustrating a first pixel PX1 included in the first area AR T, a second pixel PX2 included in the second area AR_C, and a third pixel PX3 included in the third area AR_B. Each of the first to third pixels PX1 to PX3 may be coupled to the demodulation driver 42 through the same demodulation control signal line.

The first pixel PX1 may include a first electrical contact tap and a second electrical contact tap. The first electrical contact tap may include a first control node and a first detection node. The first control node may be constituted by a P+area CNA1_1 having a relatively high doping concentration and a P− area CNA1_2 having a relatively low doping concentration. The first detection node may include an N+ area DNA1_1 having a relatively high doping concentration and an N− area DNA1_2 having a relatively low doping concentration.

The second control node may be constituted by a P+area CNB1_1 having a relatively high doping concentration and a P− area CNB1_2 having a relatively low doping concentration. The second detection node may include an N+ area DNB1_1 having a relatively high doping concentration and an N− area DNB1_2 having a relatively low doping concentration.

The P− area CNA1_2 of the first control node and the P− area CNB1_2 of the second control node may have a first depth D1. In some embodiments of the disclosed technology, the depth of the P− area indicates the distance between the lowermost part of the P− area and the top surface of the substrate.

The second pixel PX2 may include a first electrical contact tap and a second electrical contact tap. The first and second electrical contact taps of the second pixel PX2 have substantially the same structures as those of the first and second electrical contact taps of the first pixel PX1 except the depths of the P− areas of the first and second control nodes.

In the second pixel PX2, a P− area CNA2_2 of the first control node and a P− area CNB2 2 of the second control node may have a second depth D2.

The third pixel PX3 may include a first electrical contact tap and a second electrical contact tap. The first and second electrical contact taps of the third pixel PX3 have substantially the same structures as those of the first and second electrical contact taps of the first pixel PX1 except the depths of the P− areas of the first and second control nodes.

In the third pixel PX3, a P− area CNA3_2 of the first control node and a P− area CNB3_2 of the second control node may have a third depth D3.

In the pixel array 30 based on an embodiment of the disclosed technology, the depths of the first and second control nodes included in a pixel may gradually increase from the first area AR_T toward the third area AR_B or as the distance between the pixel and the demodulation driver 42 increases. Therefore, as illustrated in FIG. 8, the first depth D1 may be smaller than the second depth D2, and the second depth D2 may be smaller than the third depth D3. Since the size of an area where the first and second control nodes face each other may correspond to the cross-sectional area of an interconnect through which a current flows, the area where the first and second control nodes face each other may increase as the depths of the first and second control nodes increase, thereby reducing the pixel resistance.

Therefore, the pixel resistance may gradually decrease from the first area AR_T toward the third area AR_B, even if the voltage of the first or second demodulation control signal drops. Thus, under a condition of uniform light signals, the intensity of the pixel signal may stay uniform across the entire pixel array 30.

In an embodiment, the first and second control nodes may be formed through a total of three implant processes of implanting P− impurities. During the first implant process, an implant mask for blocking the implantation of impurities into the first area AR_T, the second area ARC and the third area AR_B may not be disposed. During the second implant process, the implant mask may be disposed in the first area AR_T. During the third implant process, the implant mask may be disposed in the first area AR_T and the second area AR_C.

Through such processes, the first and second control nodes may be formed to have different depths in each of the first area AR_T, the second area AR_C and the third area AR_B.

Figure 9:
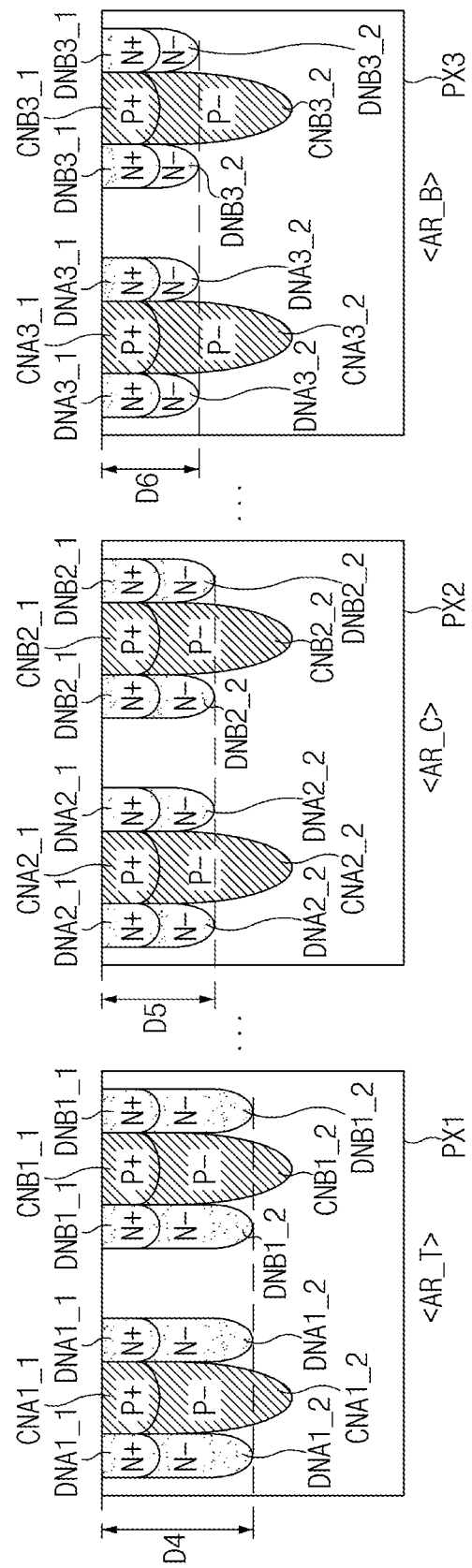
FIG. 9 is a diagram illustrating an example structure of a pixel array based on some embodiments of the disclosed technology.

FIG. 9 is a diagram illustrating an example structure of a pixel array based on some embodiments of the disclosed technology.

FIG. 9 is a vertical cross-sectional view illustrating a first pixel PX1 included in the first area AR_T, a second pixel PX2 included in the second area AR_C, and a third pixel PX3 included in the third area AR_B. Each of the first to third pixels PX1 to PX3 may be coupled to the demodulation driver 42 through the same demodulation control signal line.

The first pixel PX1 may include a first electrical contact tap and a second electrical contact tap. The first electrical contact tap may include a first control node and a first detection node. The first control node may include a P+ area CNA1_1 having a relatively high doping concentration and a P− area CNA1_2 having a relatively low doping concentration. The first detection node may include an N+ area DNA1_1 having a relatively high doping concentration and an N− area DNA1_2 having a relatively low doping concentration.

The second control node may be constituted by a P+ area CNB1_1 having a relatively high doping concentration and a P− area CNB1_2 having a relatively low doping concentration. The second detection node may be constituted by an N+ area DNB1_1 having a relatively high doping concentration and an N− area DNB1_2 having a relatively low doping concentration.

The N− area DNA1_2 of the first detection node and the N− area DNB1_2 of the second detection node may have a fourth depth D4. In some embodiments of the disclosed technology, the depth of the N− area indicates the distance between the lowermost part of the N− area and the top surface of the substrate.

The second pixel PX2 may include a first electrical contact tap and a second electrical contact tap. The first and second electrical contact taps of the second pixel PX2 have substantially the same structures as those of the first and second electrical contact taps of the first pixel PX1 except the depths of the N− areas of the first and second detection nodes.

In the second pixel PX2, an N− area DNA2_2 of the first detection node and an N− area DNB2_2 of the second detection node may have a fifth depth D5.

The third pixel PX3 may include a first electrical contact tap and a second electrical contact tap. The first and second electrical contact taps of the third pixel PX3 have substantially the same structures as those of the first and second electrical contact taps of the first pixel PX1 except the depths of the N− areas of the first and second detection nodes.

In the third pixel PX3, an N− area DNA3_2 of the first detection node and an N− area DNB3_2 of the second detection node may have a sixth depth D6.

In the pixel array 30 based on an embodiment of the disclosed technology, the depths of the first and second detection nodes included in a pixel may gradually decrease from the first area AR_T toward the third area AR_B or as the distance between the pixel and the demodulation driver 42 increases. Therefore, as illustrated in FIG. 9, the fourth depth D4 may be larger than the fifth depth D5, and the fifth depth D5 may be larger than the sixth depth D6. Since the size of an area where the first and second control nodes face each other may correspond to the cross-sectional area of a conducting line through which a current flows, the area where the first and second control nodes face each other may be increased as the depths of the first and second detection nodes decrease, which makes it possible to reduce the pixel resistance.

Therefore, the pixel resistance may gradually decrease from the first area AR_T toward the third area AR_B, even though the voltage of the first or second demodulation control signal drops. Therefore, under a condition of uniform light signals, the intensity of the pixel signal may be uniformly retained across the entire pixel array 30.

In an embodiment of the disclosed technology, the first and second detection nodes may be formed through a total of three implant processes of implanting N− impurities. During the first implant process, an implant mask for blocking the implantation of impurities into the first area AR_T, the second area AR_C and the third area AR_B may not be disposed. During the second implant process, the implant mask may be disposed in the third area AR_B.

During the third implant process, the implant mask may be disposed in the third area AR_B and the second area AR_C. Through such processes, the first and second detection nodes may be formed to have different depths in each of the first area AR_T, the second area AR_C and the third area AR_B.

As discussed above, the pixel resistance may be reduced from the first area AR_T toward the third area AR_B by varying the distances between adjacent electrical contact taps or contact nodes, or by varying the depths of the control nodes, or by varying the depths of the detection nodes, or by varying the doping profiles of the electrical contact taps, or vary two or more of the distances between adjacent electrical contact taps or contact nodes, the depths of the control nodes of the electrical contact taps, the depths of the detection nodes, and the doping profiles of the electrical contact taps. For example, while the interval between the first and second control nodes is decreased from the first area AR_T toward the third area AR_B, the depths of the first and second control nodes may be increased.

FIG. 8 illustrates that the first and second control nodes in any one pixel have the same depth, and FIG. 9 illustrates that the first and second detection nodes in any one pixel have the same depth. However, in another embodiment, the first and second control nodes in any one pixel may have different depths, and the first and second detection nodes in any one pixel may have different depths. For example, from the first area AR_T to the third area AR_B, only the depth of any one of the first and second control nodes may be increased or only the depth of any one of the first and second detection nodes may be decreased.

By way of example, the pixel array 30 is divided into three areas the first area AR_T, the second area AR_C and the third area AR_B. However, the pixel array 30 may be divided into four or more areas, such that the pixel resistance decreases as the distance between the pixel and the demodulation driver 42 increases.

Various embodiments and specific implementations of certain features have been described above as examples only. Variations and enhancements to the disclosed embodiments and other embodiments may be made based on what is disclosed and/or illustrated in this patent document.

What is claimed is:

1. An image sensing device comprising:
an image sensing pixel array comprising a plurality of image sensing pixels formed in a substrate, each image sensing pixel including a first electrical contact tap and a second electrical contact tap structured to generate a current in the substrate and capture photocharges generated by light reflected from an object and incident on the image sensing pixel array and migrating by the current to measure a distance to the object by performing demodulation operations based on the photocharges; and
a demodulation driver coupled to the image sensing pixel array to apply, to the first electrical contact tap and the second electrical contact tap, a first demodulation control signal and a second demodulation control signal for generating the current, respectively,
wherein the plurality of image sensing pixels includes first and second image sensing pixels, and wherein a distance between the first image sensing pixel and the demodulation driver is smaller than a distance between the second image sensing pixel and the demodulation driver, and wherein the first image sensing pixel is structured to have a larger resistance than the second image sensing pixel,
wherein the first electrical contact tap comprises a first control node structured to receive the first demodulation control signal and a first detection node structured to capture the photocharges, and
the second electrical contact tap comprises a second control node structured to receive the second demodulation control signal and a second detection node structured to capture the photocharges, and
wherein the first control node of the first image sensing pixel has a smaller depth than the first control node of the second image sensing pixel.

2. The image sensing device of claim 1, wherein when a voltage difference between the first and second demodulation control signals applied to the first image sensing pixel is equal to a voltage difference between the first and second demodulation control signals applied to the second image sensing pixel, the magnitude of the current of the first image sensing pixel is smaller than that of the current of the second image sensing pixel.

3. The image sensing device of claim 1, wherein the first and second image sensing pixels are coupled to the demodulation driver through a same demodulation control signal line.

4. The image sensing device of claim 1, wherein the first detection node is structured to surround the first control node, and the second detection node is structured to surround the second control node.

5. The image sensing device of claim 1, wherein the second control node of the first image sensing pixel has a smaller depth than the second control node of the second image sensing pixel.

6. An image sensing device comprising:
an image sensing pixel array comprising a plurality of image sensing pixels formed in a substrate, each image sensing pixel including a first electrical contact tap and a second electrical contact tap structured to generate a current in the substrate and capture photocharges generated by light reflected from an object and incident on the image sensing pixel array and migrating by the current to measure a distance to the object by performing demodulation operations based on the photocharges; and
a demodulation driver coupled to the image sensing pixel array to apply, to the first electrical contact tap and the second electrical contact tap, a first demodulation control signal and a second demodulation control signal for generating the current, respectively,
wherein the plurality of image sensing pixels includes first and second image sensing pixels, and wherein a distance between the first image sensing pixel and the demodulation driver is smaller than a distance between the second image sensing pixel and the demodulation driver, and wherein the first image sensing pixel is structured to have a larger resistance than the second image sensing pixel,
wherein the first electrical contact tap comprises a first control node structured to receive the first demodulation control signal and a first detection node structured to capture the photocharges, and
the second electrical contact tap comprises a second control node structured to receive the second demodulation control signal and a second detection node structured to capture the photocharges, and
wherein the first detection node of the first image sensing pixel has a larger depth than the first detection node of the second image sensing pixel.

7. The image sensing device of claim 6, wherein the second detection node of the first image sensing pixel has a larger depth than the second detection node of the second image sensing pixel.

8. An image sensing device comprising:
an image sensing pixel array comprising a plurality of image sensing pixels formed in a substrate, each image sensing pixel including a first electrical contact tap and a second electrical contact tap structured to generate a current in the substrate and capture photocharges generated by light reflected from an object and incident on the image sensing pixel array and migrating by the current to measure a distance to the object by performing demodulation operations based on the photocharges; and
a demodulation driver coupled to the image sensing pixel array to apply, to the first electrical contact tap and the second electrical contact tap, a first demodulation control signal and a second demodulation control signal for generating the current, respectively,
wherein the plurality of image sensing pixels includes first and second image sensing pixels, and wherein a distance between the first image sensing pixel and the demodulation driver is smaller than a distance between the second image sensing pixel and the demodulation driver, and wherein the first image sensing pixel is structured to have a larger resistance than the second image sensing pixel, wherein the first electrical contact tap comprises a first control node structured to receive the first demodulation control signal and a first detection node structured to capture the photocharges, and the second electrical contact tap comprises a second control node structured to receive the second demodulation control signal and a second detection node structured to capture the photocharges, and wherein a distance between the first and second control nodes of the first image sensing pixel is larger than a distance between the first and second control nodes of the second image sensing pixel.

9. The image sensing device of claim 6, wherein when a voltage difference between the first and second demodulation control signals applied to the first image sensing pixel is equal to a voltage difference between the first and second demodulation control signals applied to the second image sensing pixel, the magnitude of the current of the first image sensing pixel is smaller than that of the current of the second image sensing pixel.

10. The image sensing device of claim 6, wherein the first and second image sensing pixels are coupled to the demodulation driver through a same demodulation control signal line.

11. The image sensing device of claim 8, wherein when a voltage difference between the first and second demodulation control signals applied to the first image sensing pixel is equal to a voltage difference between the first and second demodulation control signals applied to the second image sensing pixel, the magnitude of the current of the first image sensing pixel is smaller than that of the current of the second image sensing pixel.

12. The image sensing device of claim 8, wherein the first and second image sensing pixels are coupled to the demodulation driver through a same demodulation control signal line.

\* \* \* \* \*